W. M. RYAN.
MOWING MACHINE DIVIDER ROD ATTACHMENT.
APPLICATION FILED SEPT. 16, 1913.
1,097,821.
Patented May 26, 1914.
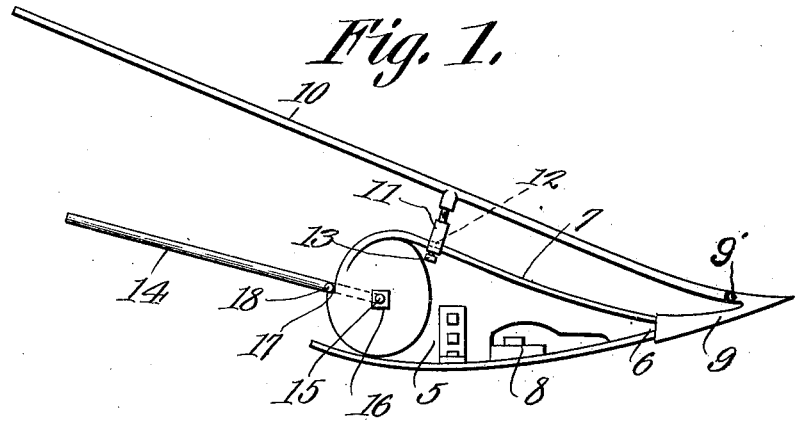
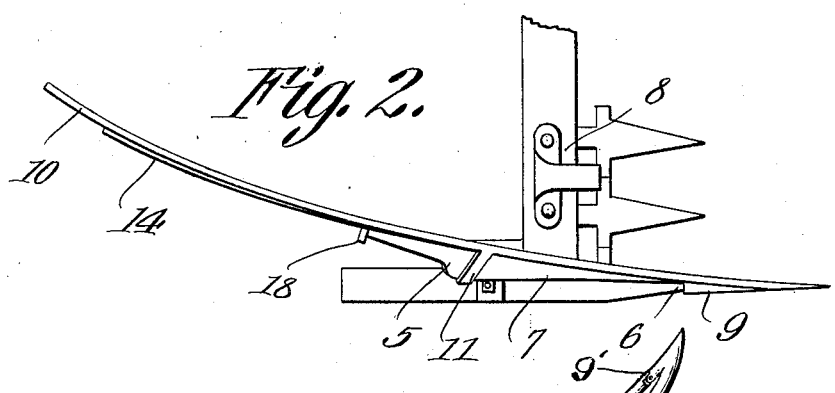
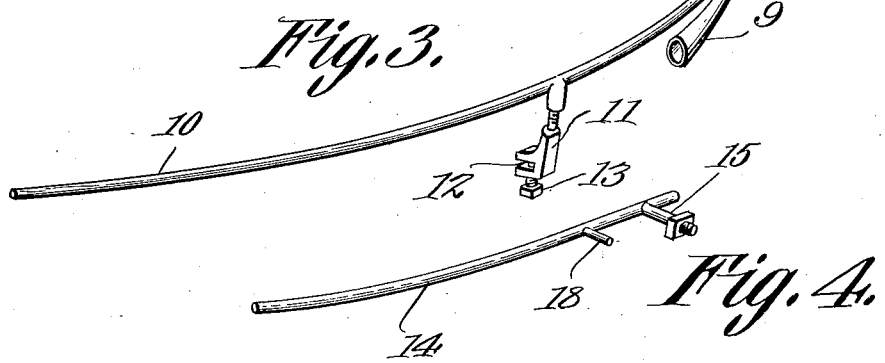
Witnesses
F. B. Wooden.
S. Willson.
W. M. Ryan
Inventor,
by C. A. Snow & Co.
Attorneys.

UNITED STATES PATENT OFFICE.

WILLIAM M. RYAN, OF HEBER, UTAH.

MOWING-MACHINE DIVIDER-ROD ATTACHMENT.

1,097,821.   Specification of Letters Patent.   Patented May 26, 1914.

Application filed September 16, 1913. Serial No. 790,061.

*To all whom it may concern:*

Be it known that I, WILLIAM M. RYAN, a citizen of the United States, residing at Heber, in the county of Wasatch and State of Utah, have invented a new and useful Mowing-Machine Divider-Rod Attachment, of which the following is a specification.

This invention relates to an attachment for mowing machines and has for an object to provide a divider whereby the cut hay will be separated and divided from that still standing.

A further object is to provide a divider attachment which may be easily and readily secured to the divider shoe of a mowing machine and will project in front of the same as well as thereabove.

A further object is to provide an auxiliary or secondary divider rod positioned beneath and slightly to one side of the first mentioned divider rod and movable with relation thereto, the two divider rods coacting to thoroughly and surely divide the cut from the uncut hay, the uppermost divider rod engaging the same adjacent the top thereof whereas the lower rod engages it below the center thereof whereby the cut material will be engaged at two points at remote sides of the center thereof and will be successfully moved away from the standing hay, so as to be out of the path of the horse during the return cut of the mowing machine and it is also to be noted that the positioning of the second divider rod slightly to one side of the upper one provides that the material coming into contact therewith will be inclined with respect to the vertical so that it will fall in the proper direction.

With the foregoing and other objects in view which will appear as the description proceeds, the invention resides in the combination and arrangement of parts and in the details of construction hereinafter described and claimed, it being understood that changes in the precise embodiment of the invention herein disclosed, can be made within the scope of what is claimed, without departing from the spirit of the invention.

In the drawings accompanying this specification and forming a part thereof, the preferable form of my invention is illustrated, in which,—

Figure 1 is a side view in elevation of my improved divider rod attachment as secured to the divider shoe of a mower machine. Fig. 2 is a top plan view thereof, the mowing machine being fragmentally illustrated. Fig. 3 is a view in perspective of the primary or upper divider rod attachment. Fig. 4 is a view in perspective of the lower or secondary divider rod which coacts with the upper divider rod to engage the cut hay or material at two points at opposite sides of the center of gravity thereof for the successful shifting or moving of the cut material laterally and away from the hay or material still standing.

Referring to the drawings in which similar reference numerals designate corresponding parts throughout the several views, 5 is the outer divider shoe of a mowing machine and is of the usual triangular contour terminating in the front pointed portion 6 and provided with a flange 7 extending along the upper edge thereof. It will be noted that only a small or fragmentary part of a mowing machine has been illustrated. In fact the drawings include only the outer dividing shoe 5 and the extreme end of the finger bar 8 which shows the relative position of the mowing machine and my improved divider rod attachment which is securable thereto.

A cone-shaped sleeve 9 is adapted to fit over the pointed end 6 of the divider shoe and to rigidly engage the same. A rearwardly and upwardly extending divider rod 10 is pivotally secured to the forward end of the cone-shaped sleeve by the hinge 9'. This rod is also given an inward bend as illustrated in the plan view in Fig. 2 so that a lateral motion will be imparted to the cut hay or material. Extending downwardly from the divider rod 10 is the extensible supporting arm 11 which as illustrated in perspective in Fig. 3, is provided with a laterally extending slot 12 adapted to receive therein and engage the upper flange 7 of the divider shoe.

The extensible supporting arm 11 is provided with a set screw 13 at the lower end thereof and which is adapted to wedgedly engage the flange 7 of the divider shoe and hold the arm rigidly thereto. Thus it will be apparent that the supporting arm 11 acts as a brace for the divider rod 10 and also locks the sleeve 9 against detachment from the divider shoe. In this connection mention is made of the fact that the divider shoe 5 with the front point or apex 6 and flange 7 is the standard equipment of divider shoe so that the applicant's device may be easily and readily secured thereto and necessitates no changes in the details of construction thereof.

A second divider rod, termed the secondary or lower rod, coacts with the upper or primary rod and although not directly connected thereto is pivotally secured to the divider shoe which supports the primary divider rod. The secondary divider rod is illustrated in perspective in Fig. 4 and includes the rod-like portion 14, an arm 15 extending transversely therefrom and which pivotally engages the divider shoe as at 16 in Fig. 1. The divider shoe 5 is provided with a ledge or stop 17 which limits the downward rotation of the rod 14, the latter being provided with an offset lug or projection 18 which contacts therewith. The pivoted manner in which the secondary divider rod is supported allows the same to move upwardly if it should contact with any obstruction in its path and also allows it to be moved upwardly and held against the divider rod 10 when the divider rod attachment considered as a whole is not to be used. As illustrated in Fig. 2 the lower or second divider rod 14 is spaced to one side of the upper divider rod 10 so that the cut hay and material which contacts with the same will be inclined with respect to the vertical as well as shifted in a lateral direction the same providing for the proper falling of the material after it has been moved inwardly due to the lateral bend of the rods.

The many advantages of the foregoing construction will be readily apparent and fully appreciated by those familiar with mowing machines and dividers therefor. The ease with which the attachment may be secured and locked to the mowing machine is noteworthy, as is also the fact that the sleeve-like connection between the divider shoe and divider rod prevents material from being caught therein and also the fact that the sleeve projects beyond the end of the divider shoe protects the same and acts as a shield or reinforcing point therefor. The upper and lower or primary and secondary rods engaging the hay or material at both sides of the center of gravity of the same provides that the same will be given a lateral movement and shift the cut hay away from the uncut or standing hay. The extensible brace 11 and pivotal mounting of the upper divider rod 10 allows the obliquity of the rod 10 to be changed so that it may be adjusted to the height of the material which is to be cut.

Having thus fully described my invention what I claim is:—

1. In a device of the class described, the combination with a pointed end divider shoe, of a primary divider rod with a cone-shaped sleeve carried by the lower extremity thereof, said cone-shaped sleeve fitting over and engaging the pointed end of said divider shoe, a supporting arm carried by said divider rod and engaging the flange of said divider shoe and adapted to be locked securely thereto, a secondary divider rod including a rod with an arm extending transversely therefrom and further provided with a projection extending transversely therefrom and adapted to abut a ledge formed on the divider shoe and providing a stop for the downward rotation of said secondary divider rod, said primary and secondary divider rods engaging the cut material upon opposite sides of the center of gravity thereof and adapted to move the same laterally with respect to the uncut material.

2. The combination with a mowing machine divider shoe, of a primary divider rod, means carried at the front end thereof for hingedly securing the same to the front extremity of said divider shoe, an extensible arm carried by the said divider rod rigidly engaging the said divider shoe adjustably holding the divider rod thereto, a secondary divider rod mounted beneath said primary divider rod and provided with an offset arm, said offset arm pivotally engaging said divider shoe providing for the independent rotation of said second mentioned divider rod in a vertical plane taken with respect to the said primary rod, the said divider shoe provided with an outstanding ledge, and a stop carried by the said secondary divider rod adapted to engage the said divider shoe ledge and limit the rotation of the said secondary divider rod in one direction.

3. The combination with a mowing machine divider shoe, of a primary divider rod, means carried at the front end thereof for hingedly securing the same to the front extremity of said divider shoe, an extensible arm carried by the said divider rod rigidly engaging the said divider shoe adjustably holding the divider rod thereto, a secondary divider rod mounted beneath said primary divider rod and provided with an offset arm, said offset arm pivotally engaging said divider shoe provided for the independent rotation of said secondary divider rod in a vertical plane taken with respect to the said primary rod, the said divider shoe provided with an outstanding ledge, and a stop carried by the said secondary divider rod adapted to engage the said divider shoe ledge and limit the rotation of the said secondary divider rod in one direction, the said primary and secondary divider rods extending upwardly, rearwardly and inwardly, the said secondary rod offset from a vertical plane including the primary divider rod to shift the cut material which contacts therewith and to move the said material out of a vertical plane.

In testimony that I claim the foregoing as my own, I have hereto affixed my signature in the presence of two witnesses.

WILLIAM M. RYAN.

Witnesses:
E. PARLEY CLIFF,
LECLARE HYLTON.

Copies of this patent may be obtained for five cents each, by addressing the "Commissioner of Patents, Washington, D. C."